F. W. KENT & T. P. MIDDLETON.
TRANSFER PROCESS.
APPLICATION FILED JUNE 17, 1916.
1,299,479.
Patented Apr. 8, 1919.
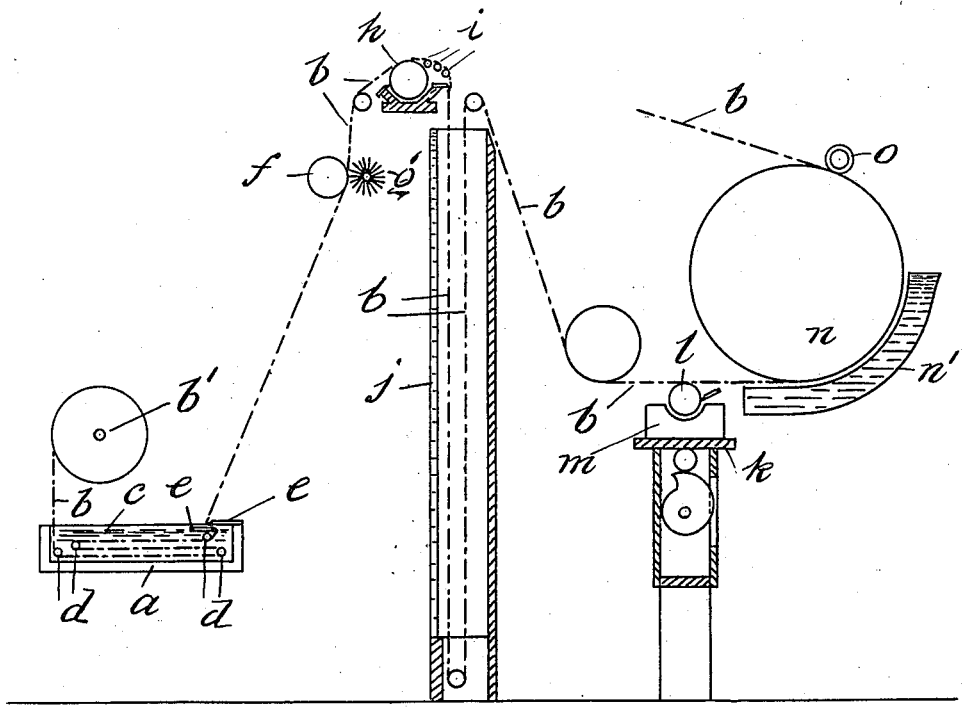
Inventors
F. W. Kent and T. P. Middleton
per
Attorney

UNITED STATES PATENT OFFICE.

FRANK WILLIAM KENT, OF CLAPHAM, LONDON, AND THOMAS PERCY MIDDLETON, OF FARNHAM, ENGLAND, ASSIGNORS TO KEROTYPE, LIMITED, OF LONDON, ENGLAND.

TRANSFER PROCESS.

1,299,479.  Specification of Letters Patent.  Patented Apr. 8, 1919.

Application filed June 17, 1916. Serial No. 104,328.

*To all whom it may concern:*

Be it known that we, FRANK WILLIAM KENT, and THOMAS PERCY MIDDLETON, subjects of His Majesty the King of England, respectively residing at Clapham, London, England, and Farnham, Surrey, England, have invented certain new and useful Improvements in Transfer Processes, of which the following is a specification.

The present invention deals with improvements in the method of transfer described in the specification of F. W. Kent's United States application for Patent Serial No. 806,445, filed December 13, 1913, these improvements severally and conjointly conducing to the better carrying out of the invention of the said prior patent and further conducing to the production of that waxed paper which bears the sensitive stratum, under the best mechanical and industrial conditions it becoming possible to produce the paper as a continuous band, and coating or further treating the paper as a continuous band.

Thus in relation to the brush polishing of the waxed paper prepared as described in the aforementioned specification it has been found desirable to perform the operation before the waxed paper has become completely cold, this contributing to a complete laying down of the projecting fibers, and it is expedient to use a rotary brush or buff as not being calculated to lift or raise those fibers which have once been laid.

When the paper saturated with wax is a sized paper of ordinary character the sizing material so far maintains some permeability to moisture that gelatin or a water-soluble cement may be advantageously used as the cementing agent in effecting the transfer from the waxed paper, so the preference expressed in the aforementioned specification for a resinous or resinoid cement gives place to a preference for a gelatinous or water-soluble cement. The commercial viscous fish glue may be used or a nearly cold gelatin solution, preferably a solution made with both water and alcohol, or water, alcohol and acetic acid, or a solution of gum, dextrin or the like. The cementing material having been flooded on, or applied to the surface to which the photograph is to be transferred, the print, as developed or prepared on the waxed basis, is applied in accordance with the known practice for avoiding the inclusion of air bubbles, and contact is established by means of a squeegee or by a roller or other means, the excess of the adhesive substance being at the same time forced out. When the cement is set, or practically dry, or dry, the wax-paper backing is stripped off.

A further and important aspect of the present invention relates to the coating or substratum which facilitates the spreading of the sensitive emulsion on the waxed paper base. In the aforementioned specification reference is made to the softening effect which acetic acid alone or mixed with alcohol exercises on the waxed surface and very wide variations of the prescribed mixture are indicated as possible.

In carrying out the invention as disclosed in Kent's specification above-mentioned, it was found that the adhesion of the Vogel solution to the waxed paper was inconveniently slow, the so called Vogel's composite or collodio-gelatin emulsion consisting essentially of gelatin emulsion and pyroxylin emulsion both dissolved in acetic acid, which emulsion may be characterized as a sensitive gelatin-pyroxylin emulsion in acetic acid; that the drying off was less rapid than is desirable for continuous coating on a band of waxed paper and for drying the moving band; and further, that when these forms of Vogel substratum were used as the insensitive basis of the above mentioned Vogel's emulsion which contain gelatin there was an unsuitability for preparing prints in which a stratum of bichromated and pigmented gelatin is exposed to light so as to render the exposed parts insoluble, and afterward the unexposed or soluble parts are washed away by warm water after the manner of so called "carbon" printing. Doing this is an aspect made practicable by the present invention.

By one aspect of the present invention, pyroxylin in a rather more volatile solvent than recommended in Kent's specification is used a mixture of non-anhydrous acetic ether or other water-soluble ether and spirits of wine (non-anhydrous alcohol) being used. Further the pyroxylin should be of the porous type and by these modifications a substratum of a "powdery" type is insured, the "powdery", friable or rotten condition of the film being favored by the use of water in the mixture, but glycerin may be used instead of water. Alternatively any nitro-cellulose solution may be used which dries in an even "powdery" film, such a solution being an ordinary alcohol ether collodion not made with anhydrous solvents, but owing to the volatility of the ether this is not very convenient for machine coating. The following has been found to work well in practice:—

Non-anhydrous acetic ether ---- 2½ gallons.
Alcohol of about 90% strength
  (S. V. R.) ------------------ 7½ gallons.
Pyroxylin ---------------------- 1 lb.

This mixture readily adheres to or flows on the waxed paper and when dry allows the easy separation of the developed print. Any trace of the substratum which remains on the transfer print can be removed by gentle friction with a tuft of cotton charged with benzene or other similar solvent or detergent.

The following description in detail will assist in carrying out the present invention with good results; this description having reference to the accompanying diagrammatic view of concatenated devices which will serve well for carrying out the present improved method by a continuous operation, it being understood that a working of the improved method is not confined to any particular construction or arrangement of machine.

The wax employed is a good quality of paraffin wax (one having a melting point 132–134° F. being found to work well). The wax is kept at a temperature of 185–190° F., in a water jacketed copper pan $a$. To this pan the paper $b$ is led from a supply roller $b^1$, the distance of travel of the paper $b$ through the wax $c$ being increased by passing the paper back and forth around rollers $d\ d$. The temperature of the wax may vary so long as it does not go beyond the point at which the sizing of the paper is affected with objectionable results, such as irregular expansion and possible disruption: hence it is important to make provision for preventing liability of any over heating of the wax taking place, the water jacketing referred to being such a provision.

This procedure insures that the paper shall be fully saturated with the wax, a somewhat longer immersion than that described in the aforesaid specification of Kent Serial No. 806,445, filed December 13, 1913, being preferred as this tends to increase the transparency and to improve the texture of the resulting product; on leaving the wax the paper passes between "doctors" $e,\ e$ arranged in baffle order as shown, which remove the excess of wax.

The paper then passes upward and is subjected to a buffing or polishing process by passing between a roller $f$ and a polishing buff or brush $g$ as shown. The buff or brush is revolved at a speed much higher than the surface speed of the paper, a peripheral speed of the buff of from 700 to 900 feet per minute and a surface speed of the paper of 10 feet per minute working well. This buffing on the set but still warm wax, has a great smoothing effect which is of alvantage. It is found that coatings do not strip nearly so well from unbuffed waxed paper as from that buffed in or after the manner described.

The buffing or brushing in one direction smooths down the hairs which may rise owing to the heat reversing the effect of calendering.

The paper then passes over a roller $h$ as shown, the roller $h$ traveling slightly faster than the paper, and bends over a series of rods $i$ which serve to distribute the substratum-mixture and return the excess to the containing pan, by means of a glass strip which is not shown. This arrangement applies a very thin layer evenly and all over the wax surface. A constant level arrangement is advisable.

The composition of the substratum is conveniently as follows:—

Nitrocotton 1 part by weight dissolved in 100 parts by measure of 3 parts alcohol of about 90% strength S. V. R. and 1 part ethyl acetate (not anhydrous). This is the medium generally to be preferred. It coats easily, it permits of subsequent easy coating without blisters or other troubles and it allows of easy stripping.

This use of this solution is the main variation from the prior specification of Kent. The plain ethyl acetate and alcohol collodion on drying with or without heat, gives a friable, rotten or pulverulent film which rubs off with the traces of wax on the final transferring. It is to be understood that any water soluble ether or any water soluble alcohol may be used, the essential condition for success being the porosity, friability or pulverulent nature of the dried film.

As a variant to the presence of water in the collodion, glycerin, soap, mannite, etc., may be used to obtain porosity.

The proportion of alcohol to ether may be any convenient proportion and the ether may even be omitted if methyl alcohol is used.

After being coated with substratum the paper passes down and up a long open-ended trunk $j$; which is hot water jacketed on three sides and the fourth, constituted as a door or as a removable side, is lagged to prevent loss of heat. The "substratumed" paper is thus dried preparatory to passing to the coating device. The heat of the drying chamber should not be so great as to melt the wax.

The paper then passes to a coating machine $k$ which is shown as of quite ordinary type and requires little explanation, except that for convenience the coating should be narrower than the waxed paper so as to leave a strip at each side uncoated on which two rubber surfaces press to give the necessary tension. As depicted, $l$ is the coating emulsion roller, $m$ the corresponding trough, $n$ the cooling or setting drum which may be either self contained or combined with an external ice box $n^1$, the former being preferred, and $o$ the pull off rollers.

The coating emulsion is of any convenient type but preferably contains 10% of alcohol and a little glucose or glycerin if the coating is to be thick. Any gelatinous mixture whether sensitive or capable of being sensitized may be used.

The paper then passes to a suitable looping arrangement, and dried.

As an adhesive for transfer to porous supports such as wood, paper, fabric, etc., a solution of gelatin e. g., a 5% solution of Nelson's transparent sheet or other soft gelatin is preferred with or without the addition of chrome alum. This permits of easy register of one image upon another by actual visual registration as shift of one surface on the other is easy. As an alternative, gum arabic solution is also available but this tends to cause the edges to leave rather ragged. Also as an alternative a mucilage of gum tragacanth will serve. On drying, the wax paper is pulled off and rubbing with a pledget of cotton wool with or without benzene or like detergent completes the process.

For transfer onto impervious supports such as porcelain, celluloid, etc., both surfaces are flooded with gelatin solution, allowed to become more or less tacky and then rubbed into contact. If necessary a slightly warm iron is used to promote adhesion. Stripping then takes place at any time after the gelatin is set.

Gelatin is preferred as the medium for transfer as however many layers may be present the final effect is one homogeneous body. Gelatin transferred prints can be scratched without signs of separation. Rubber or resinoid-transferred prints are more tender, the degree of tenderness depending on the amount of rubber that is present, the more rubber being present the more tender being the prints.

What we claim is:—

1. Process of making photographic printing and transfer paper which comprises completely saturating with wax a sheet of paper, coating the paper with a nitro-cellulose solution giving on drying a film of porous nitro-cellulose as a substratum to a sensitive stratum, and over said film coating with a sensitive stratum.

2. Photographic printing and transfer paper comprising a base of wax saturated paper carrying a substratum consisting of porous nitro-cellulose, and over this carrying a sensitive stratum.

3. Photographic printing and transfer paper consisting of a base of wax saturated paper carrying a substratum consisting of porous nitro-cellulose and a sensitive stratum for a wash out process.

4. Process of preparing photographic printing and transfer paper by a continuous operation which consists in conducting paper in the web through melted paraffin wax, thence between "doctors" to a buffing device located so as to act on the wax when this is set but while this is still warm, thence to a substratum coating device which applies and distributes the solution, also removes the excess, and thence through a drying chamber to an emulsion coating machine, the paper being finally led over a cooling or setting drum to the drying place.

In testimony whereof, we affix our signatures.

FRANK WILLIAM KENT.
THOMAS PERCY MIDDLETON.